US012179483B2

(12) United States Patent
Kiji

(10) Patent No.: US 12,179,483 B2
(45) Date of Patent: Dec. 31, 2024

(54) LIQUID EJECTION HEAD

(71) Applicant: RISO Technologies Corporation, Tokyo (JP)

(72) Inventor: Yasuhito Kiji, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 143 days.

(21) Appl. No.: 18/160,910

(22) Filed: Jan. 27, 2023

(65) Prior Publication Data

US 2023/0302793 A1 Sep. 28, 2023

(30) Foreign Application Priority Data

Mar. 28, 2022 (JP) ................................ 2022-052428
Jan. 26, 2023 (JP) ................................ 2023-010541

(51) Int. Cl.
*B41J 2/045* (2006.01)

(52) U.S. Cl.
CPC ....... *B41J 2/04588* (2013.01); *B41J 2/04581* (2013.01)

(58) Field of Classification Search
CPC ................ B41J 2/04588; B41J 2/04581; B41J 2/14032; B41J 2/1404; B41J 2/14145
See application file for complete search history.

(56) References Cited

U.S. PATENT DOCUMENTS 5,576,743 A 11/1996 Momose
8,087,760 B2 1/2012 Hibi
8,777,349 B2 7/2014 Tobita
2006/0092201 A1 5/2006 Gardner
2010/0171778 A1* 7/2010 Ozawa ................ B41J 2/04588 347/10
2020/0189271 A1* 6/2020 Kiji ...................... B41J 2/04598
2022/0314616 A1* 10/2022 Kakiuchi ............. B41J 2/04591

FOREIGN PATENT DOCUMENTS

EP 0616891 A1 9/1994
JP S62288049 A 12/1987
JP 2010158843 * 7/2010

OTHER PUBLICATIONS

Extended European Search Report dated Aug. 9, 2023, mailed in counterpart European Application No. 23161348.0, 8 pages.

* cited by examiner

*Primary Examiner* — Kristal Feggins
(74) *Attorney, Agent, or Firm* — Kim & Stewart LLP

(57) ABSTRACT

According to one embodiment, a liquid ejection head includes a nozzle plate, pressure chambers, actuators, and a drive circuit. The nozzle plate includes nozzles for ejecting liquid. The pressure chamber communicates with the nozzles. The actuator varies the volume of the pressure chamber according to a drive signal. The drive circuit generates the drive signal for driving the actuator. The ejection waveform in the drive signal includes an expansion potential difference changes that changes in stages and a contraction potential difference change that changes in stages. The drive circuit sets the timing of the stages to cancel the vibration of an acoustic resonance frequency in a frequency range higher than a main acoustic resonance frequency of the liquid in the pressure chamber.

20 Claims, 12 Drawing Sheets

FIG. 7

| WAVEFORM | VOLUME OF LEADING DROPLET (pL) | VOLUME OF ALL EJECTION (pL) | LEADING DROPLET / ALL EJECTION | EJECTION VOLTAGE (V) |
|---|---|---|---|---|
| tr=0.2 μs | 0.4 | 2.5 | 0.16 | 15.7 |
| Tm=0.46 μs | 1.1 | 3.3 | 0.33 | 19.0 |
| Tm=0.62 μs | 1.6 | 3.5 | 0.46 | 21.1 |
| Tm=0.77 μs | 1.8 | 3.4 | 0.53 | 21.9 |
| Tm=0.93 μs | 1.7 | 3.1 | 0.55 | 22.1 |
| Tm=1.08 μs | 1.3 | 2.8 | 0.46 | 21.4 |
| Tm=1.23 μs | 1.2 | 2.4 | 0.50 | 21.3 |
| Tm=1.39 μs | 1.3 | 2.7 | 0.48 | 23.3 |

LIQUID EJECTION HEAD

CROSS-REFERENCE TO RELATED APPLICATIONS

This application is based upon and claims the benefit of priority from Japanese Patent Application No. 2022-052428, filed on Mar. 28, 2022, and Japanese Patent Application No. 2023-010541, filed on Jan. 26, 2023, the entire contents of which are incorporated herein by reference.

FIELD

Embodiments described herein relate generally to a liquid ejection head.

BACKGROUND

In the related art, a technique for controlling the timing of meniscus vibration and suppressing satellites (satellite droplets) by adjusting the rise time or fall time of the drive waveform for a liquid ejection head has been studied. Such a technique requires a drive circuit capable of adjusting the rise time or fall time of the drive waveform, but this generally results in an increase in power consumption and cost.

BRIEF DESCRIPTION OF THE DRAWINGS

FIG. 7 is a table depicting a relationship between drive waveforms and ejected droplets for an example of a liquid ejection head.

DETAILED DESCRIPTION

An object of the present disclosure is to provide a liquid ejection head with a simple circuit configuration that provides high print quality by suppression of vibrations of a frequency higher than the main acoustic vibration while reducing power consumption.

In general, according to one embodiment, a liquid ejection head includes a nozzle plate, pressure chambers, actuators, and a drive circuit. The nozzle plate includes nozzles for ejecting liquid. The pressure chamber communicates with the nozzles. The actuator varies the volume of the pressure chamber according to a drive signal. The drive circuit generates the drive signal for driving the actuator. The ejection waveform in the drive signal includes an expansion potential difference changes that changes in stages and a contraction potential difference change that changes in stages. The drive circuit set the timing of the stages to cancel the vibration of an acoustic resonance frequency in a frequency range higher than a main acoustic resonance frequency of the liquid in the pressure chamber.

Figure 1:
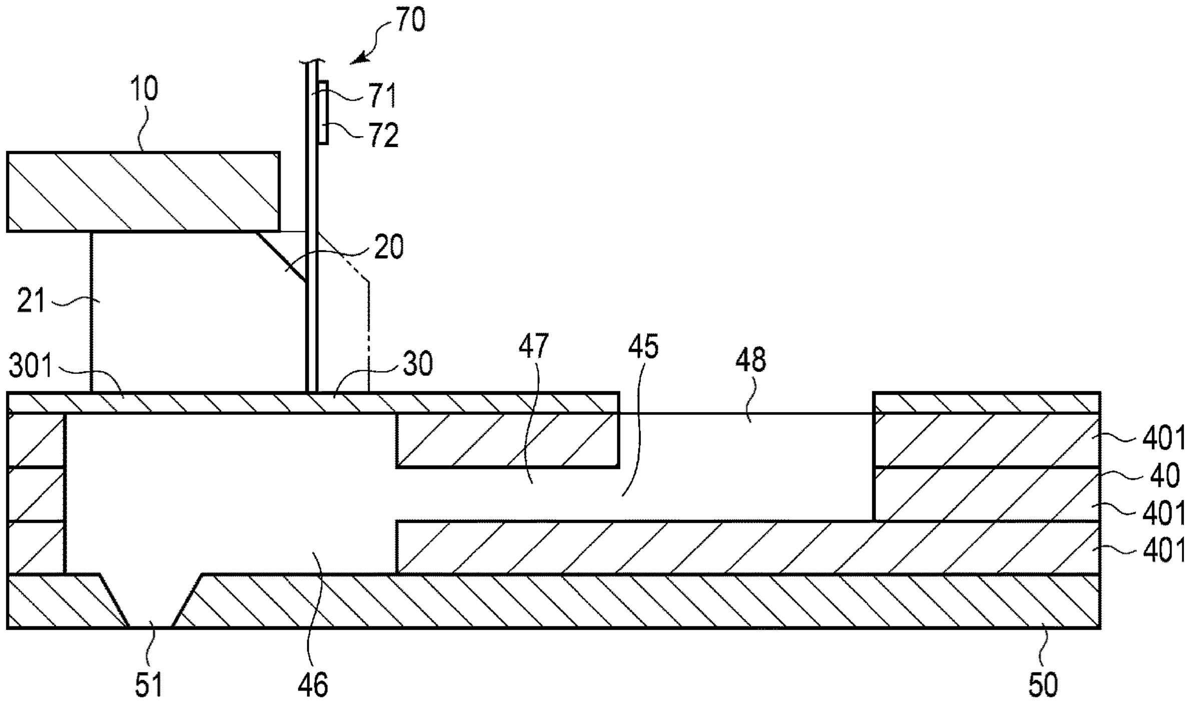
FIG. 1 is a cross-sectional view of a liquid ejection head according to an embodiment.
Figure 2:
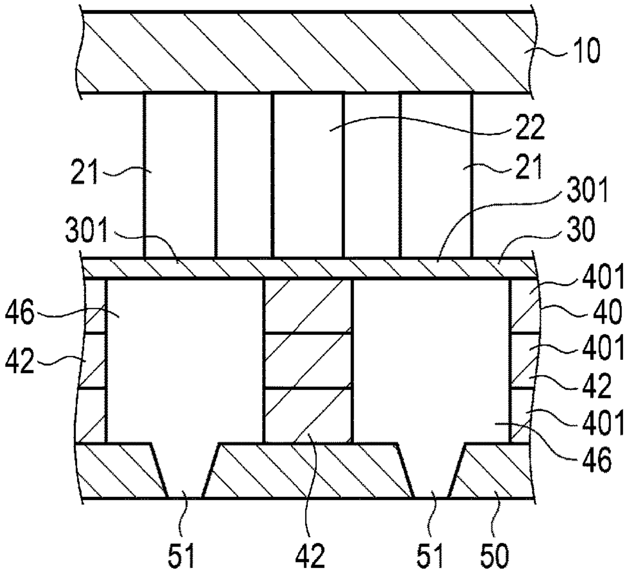
FIG. 2 is another cross-sectional view of a liquid ejection head according to an embodiment.
Figure 3:
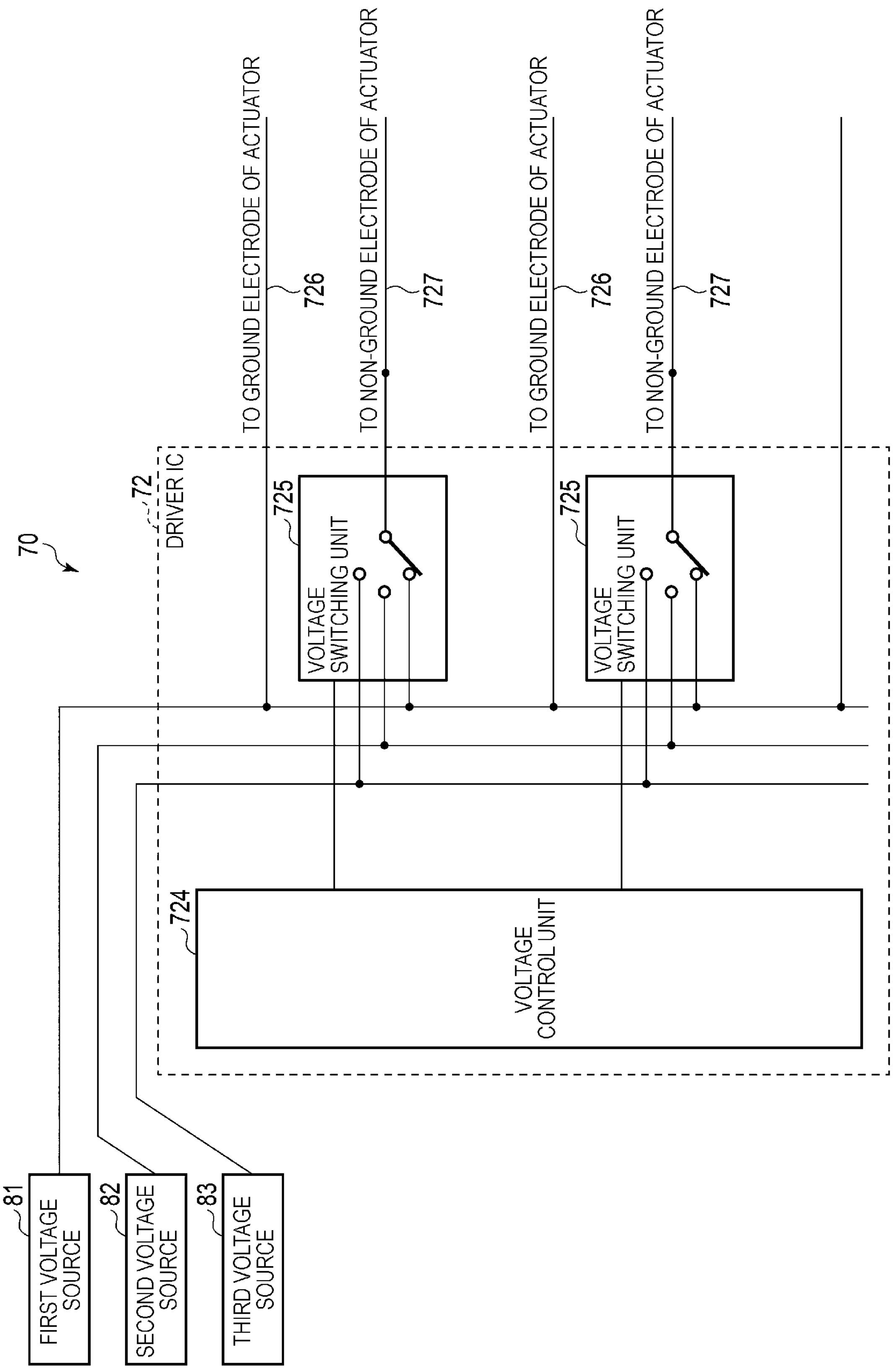
FIG. 3 is a block diagram of a drive circuit.
Figure 4:
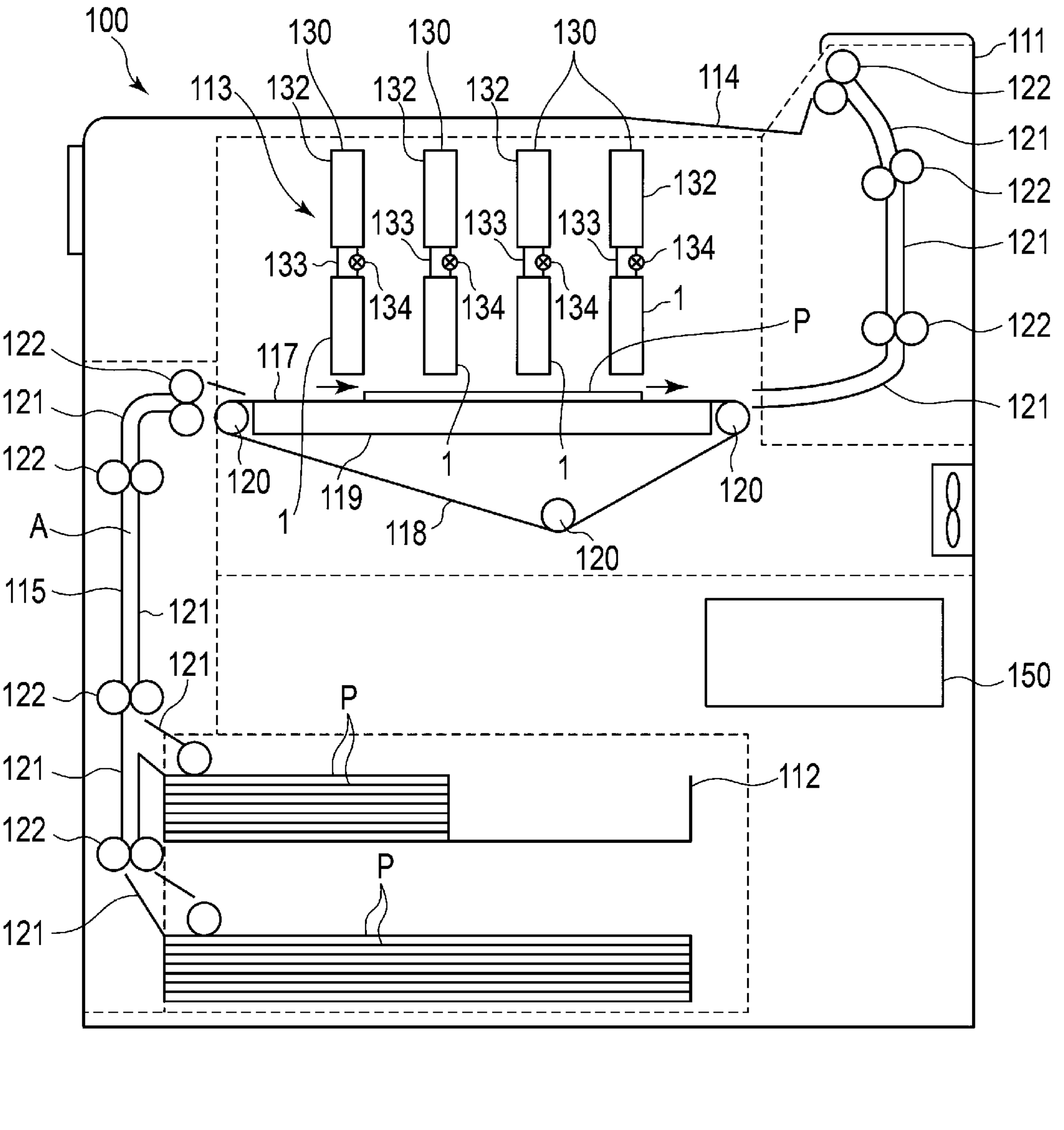
FIG. 4 depicts a liquid ejection apparatus incorporating a liquid ejection head according to an embodiment.
Figure 5:
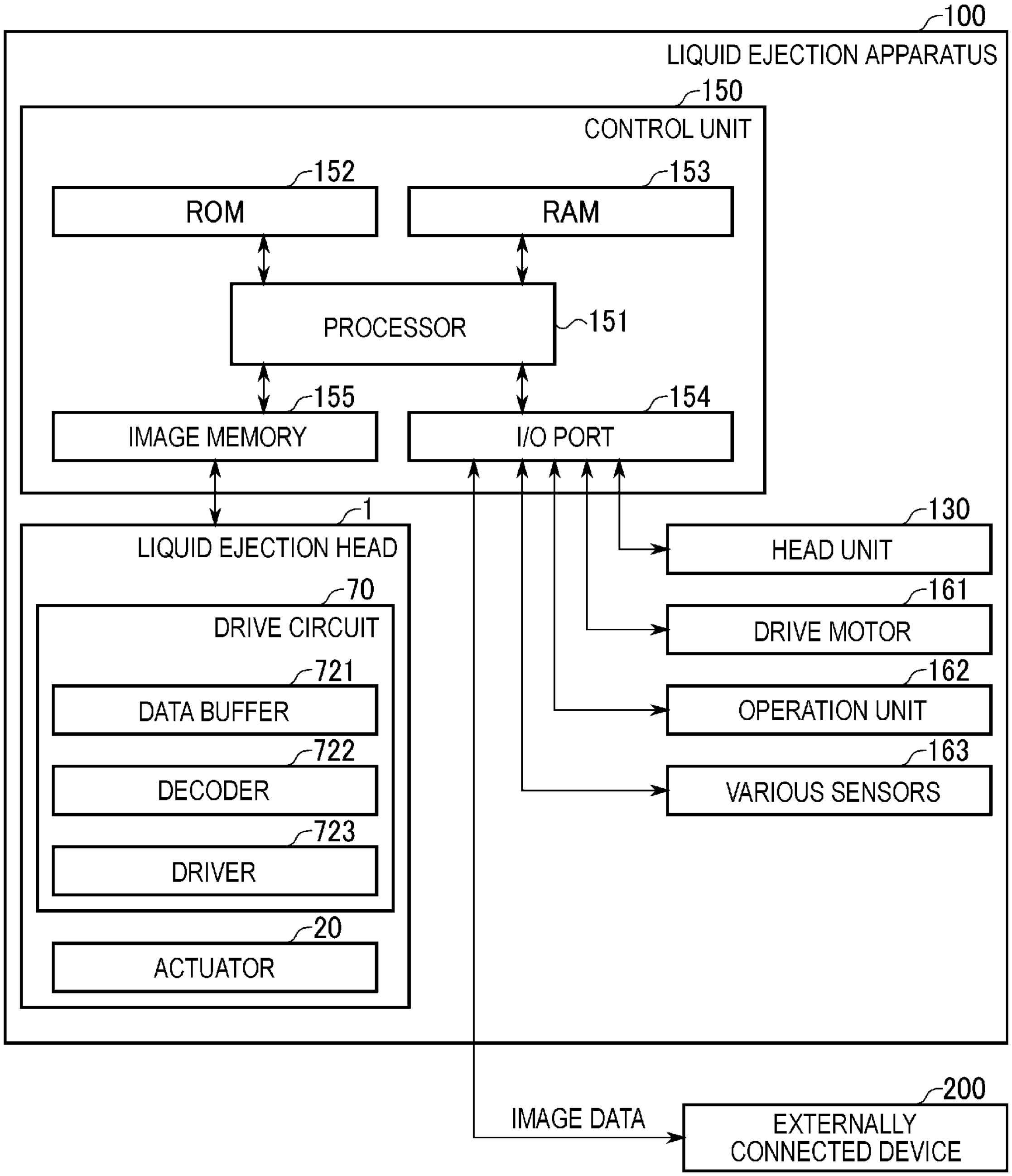
FIG. 5 is a block diagram of a liquid ejection apparatus.

The configuration of a liquid ejection head 1 according to an embodiment and a liquid ejection apparatus 100 using a liquid ejection head 1 will be described with reference to FIGS. 1 to 5. FIG. 1 is a cross-sectional view of the liquid ejection head 1 according to the embodiment, and FIG. 2 is another cross-sectional view of the liquid ejection head 1. Certain aspects are omitted from the depictions in FIG. 1 and FIG. 2 so particular configurational details may be highlighted. FIG. 3 is a block diagram schematically showing the configuration of a drive circuit 70 of the liquid ejection head 1. FIG. 4 is an explanatory diagram showing the overall configuration of the liquid ejection apparatus 100 using the liquid ejection head 1 according to the embodiment. FIG. 5 is a block diagram showing an example of the configuration of the liquid ejection apparatus 100. In each drawing, the components or the like can be shown enlarged, reduced, or omitted as appropriate. That is, the drawings are schematic and not necessarily to scale.

The liquid ejection head 1 according to the present embodiment can be an inkjet head that ejects ink. As shown in FIGS. 1 and 2, the liquid ejection head 1 includes a base 10, an actuator 20, a diaphragm 30, a channel plate 40, a nozzle plate 50 (having a plurality of nozzles 51), and a drive circuit 70.

The base 10 is formed as a rectangular plate shape in this example. The actuator 20 is joined to the base 10.

The actuator 20 is, for example, a piezoelectric member including piezoelectric columns 21, and non-driven piezoelectric columns 22 alternately arranged with the piezoelectric columns 21. The actuator 20 is formed in a comb shape by arranging the plurality of piezoelectric columns 21 and the plurality of non-driven piezoelectric columns 22 in one direction at predetermined intervals. For example, the actuator 20 may be formed by forming a groove by dicing a stacked piezoelectric member joined to the base 10 to form a plurality of piezoelectric elements at predetermined intervals. The plurality of piezoelectric elements thus formed eventually constitute the plurality of piezoelectric columns 21 and the plurality of non-driven piezoelectric columns 22. That is, the actuator 20 is divided into a plurality of parts on one end side (diaphragm 30 side) by the plurality of formed grooves and connected to the other end side (base 10 side).

For example, the stacked piezoelectric member that constitutes the actuator 20 is formed by laminating and sintering sheet-like piezoelectric materials together. As a specific example, as shown in FIGS. 1 and 2, the piezoelectric column 21 and the non-driven piezoelectric column 22 are, for example, stacked piezoelectric bodies. The piezoelectric column 21 and the non-driven piezoelectric column 22 include stacked piezoelectric layers, internal electrodes formed on the main surfaces of each piezoelectric layer, and external electrodes. In this example, the piezoelectric columns 21 and the non-driven piezoelectric columns 22 have the same configuration.

The piezoelectric layer is made of a piezoelectric material such as PZT (lead zirconate titanate) or lead-free KNN (sodium potassium niobate) in the form of a thin plate. A plurality of piezoelectric layers are stacked in the thickness direction and adhered by sintering. Here, the stacking direction of the plurality of piezoelectric layers is perpendicular to the direction in which the plurality of piezoelectric columns 21 and the plurality of non-driven piezoelectric columns 22 are arranged.

Each internal electrode is a conductive film made of a sinterable conductive material such as silver palladium that is formed into a predetermined shape. The internal electrodes are formed in predetermined regions on the main surface of each piezoelectric layer. The plurality of internal electrodes are alternately arranged with different polarities along the alignment direction.

The external electrodes are formed on the surfaces of the plurality of piezoelectric columns 21 and the plurality of non-driven piezoelectric columns 22. The external electrodes are formed of Ni, Cr, Au, or the like by any known fabrication method such as plating or sputtering. The plurality of external electrodes are arranged on different side portions of the piezoelectric columns 21 and the non-driven piezoelectric columns 22 and configured to have different polarities. The external electrodes with different polarities may be routed to different regions.

In the present embodiment, the plurality of external electrodes includes individual electrodes formed respectively on the plurality of piezoelectric columns 21 and the plurality of non-driven piezoelectric columns 22, and a common electrode formed continuously. A plurality of individual electrodes formed on each of the plurality of piezoelectric columns 21 and the plurality of non-driven piezoelectric columns 22 are arranged independently of each other. The common electrode is grounded, for example.

These external electrodes are connected to the drive circuit 70, for example. For example, the individual external electrodes are connected to a control unit 150 via a driver 723 of the drive circuit 70 by wiring and are configured to be individually drive-controllable under the control (selection) of the processor 151.

The piezoelectric column 21 and the non-driven piezoelectric column 22 vibrate longitudinally along the stacking direction of the piezoelectric layers when a voltage is applied to the internal electrodes via the external electrodes. The longitudinal vibration referred to here is, for example, "vibration in the thickness direction defined by the piezoelectric constant d33". For example, as shown in FIG. 2, the piezoelectric columns 21 are arranged to correspond in position to the pressure chambers 46 with the diaphragm 30 interposed therebetween, and the non-driven piezoelectric columns 22 are arranged at positions facing partition wall portions 42 across the diaphragm 30.

The piezoelectric column 21 longitudinally vibrates when a voltage is applied, displacing the diaphragm 30. That is, the piezoelectric column 21 deforms the pressure chamber 46. The non-driven piezoelectric column 22 is arranged at a position facing the partition wall portion 42. No voltage is applied to the non-driven piezoelectric columns 22. That is, each piezoelectric column 21 constitutes an actuator that deforms a pressure chamber 46 when driven, and each non-driven piezoelectric column 22 constitutes a column (support). A piezoelectric column 21 expands and contracts a pressure chamber 46 to vary the volume of the pressure chamber 46 for purposes of ejection of liquid from a nozzle 51 or the like.

The diaphragm 30 is joined to one side of the piezoelectric layers of the plurality of piezoelectric columns 21 and 22 in the stacking direction, that is, to the surface on the nozzle plate 50 side. The diaphragm 30 is deformed by driving of a piezoelectric column 21. The diaphragm 30 is bonded to the piezoelectric columns 21 as well as the non-driven piezoelectric columns 22 of the actuator 20.

The diaphragm 30 is, for example, a flat plate arranged so that the thickness direction is the stacking direction of the piezoelectric layers. The diaphragm 30 extends in the planar direction in which the plurality of piezoelectric columns 21 and the plurality of non-driven piezoelectric columns 22 are arranged. The diaphragm 30 can be a metal plate. The diaphragm 30 has a plurality of vibrating portions 301 that face the pressure chambers 46 and these vibrating portions 301 can be displaced individually. The diaphragm 30 of this example is formed by integrally of the plurality of vibrating portions 301.

For example, the diaphragm 30 is configured as a single flat plate, and the regions (portions 301) joined to the piezoelectric columns 21 are individually displaceable. The diaphragm 30 is made of, for example, a SUS (stainless steel) plate. In some examples, diaphragm 30 may have creases or stages formed at positions adjacent to the vibrating portions 301 or between the vibrating portions 301 adjacent to each other so that the plurality of vibrating portions 301 can be more easily displaced.

The diaphragm 30 expands and contracts a pressure chamber 46 by displacing the portion (301) arranged facing the piezoelectric column 21 by the longitudinal vibration of the piezoelectric column 21, thereby varying the internal volume of the pressure chamber 46.

The diaphragm 30 has one main surface bonded to the actuator 20 and the other main surface bonded to the channel plate 40. A pressure chamber 46 capable of containing ink is formed between the diaphragm 30 and the channel plate 40.

The diaphragm 30 has one main surface facing the piezoelectric columns 21 and 22, and the other main surface facing the pressure chambers 46 and the partition wall portion 42.

The channel plate 40 is joined (bonded) to the diaphragm 30. The channel plate 40 is arranged between the nozzle plate 50 and the diaphragm 30. The channel plate 40 has a plurality of partition wall portions 42. Also, the channel plate 40 has a predetermined channel 45. The channel plate 40 can be formed by stacking a plurality of plates 401.

A plurality of partition wall portions 42 are arranged in the direction in which the plurality of piezoelectric columns 21 and 22 are arranged, and face the non-driven piezoelectric columns 22 via the diaphragm 30. The partition wall portions 42 separate a plurality of pressure chambers 46 from the predetermined channel 45 and separate a plurality of individual channels 47 from one another.

The predetermined channels 45 include pressure chambers 46 separated from each other by the partition wall portions 42 of the channel plate 40, individual channels 47 separated from each other by the partition wall portions 42, and a common channel 48 communicating with (fluidly connected to) each of the individual channels 47.

The pressure chambers 46 are aligned in the direction in which the piezoelectric columns 21 and the non-driven piezoelectric columns 22 are arranged and face the plurality of piezoelectric columns 21 via the diaphragm 30. The pressure chambers 46 are separated by the partition wall portions 42. The partition wall portions 42 arranged between the pressure chambers 46 face non-driven piezoelectric columns 22 via the diaphragm 30. The pressure chambers 46 are formed by covering one side of the channel plate 40 with the diaphragm 30 and covering the other side with the nozzle plate 50. A nozzle 51 formed in the nozzle plate 50 is arranged in correspondence with each pressure chamber 46.

The plurality of pressure chambers 46 communicate with the common channel 48 via the individual channels 47. The pressure chamber 46 holds the liquid supplied from the common channel 48 through the individual channel 47 and is deformed by the vibration of the diaphragm 30 and thus ejects the liquid from the nozzle 51. The individual channels 47 connect the common channel 48 and the pressure chambers 46. The individual channels 47 are provided in the same number as the pressure chambers 46 (one-to-one basis). The channel cross-sectional shape of the individual channel 47 is different from the channel cross-sectional shape of the pressure chamber 46. The channel cross-sectional area of the individual channel 47 is smaller than the channel cross-sectional area of the pressure chamber 46. The common channel 48 is fluidly connected to the plurality of individual channels 47 and communicates with the pressure chambers 46 through the individual channels 47.

The nozzle plate 50 is made of, for example, metal such as SUS/Ni or a resin material such as polyimide. The nozzle plate 50 is joined to the channel plate 40 and covers the plurality of pressure chambers 46. The nozzle plate 50 has a plurality of nozzles 51 formed at positions facing the plurality of pressure chambers 46. A nozzle row is formed by the plurality of nozzles 51.

As shown in FIG. 5, the drive circuit 70 includes a data buffer 721, a decoder 722, and a driver 723. The data buffer 721 stores print data for each of the piezoelectric columns 21 (pressure chambers 46) in the time series. The decoder 722 controls the driver 723 based on the print data stored in the data buffer 721 for each of the piezoelectric columns 21. The driver 723 outputs drive signals for operating particular piezoelectric columns 21 under the control of the decoder 722. A drive signal is a voltage applied to a piezoelectric column 21.

As a specific example, as shown in FIG. 1, the drive circuit 70 includes a wiring film 71 having one end connected to an external electrode, a driver IC 72 mounted on the wiring film 71, and a printed wiring board mounted on the other end of the wiring film 71. For example, the driver IC 72 includes the data buffer 721, the decoder 722, and the driver 723. The data buffer 721, the decoder 722, and the driver 723 may be included (in whole or in part) in the driver IC 72, or may be included in the printed wiring board or the like.

The drive circuit 70 applies a drive voltage to the external electrode from the driver IC 72 to drive a piezoelectric column 21 and vary the volume of the corresponding pressure chamber 46, thereby ejecting droplets from the nozzle 51 of the pressure chamber 46.

The wiring film 71 is connected to the plurality of individual electrodes and the common electrode. For example, the wiring film 71 is an ACF (anisotropic conductive film) fixed to the connecting portion of the external electrode by thermocompression bonding or the like. The wiring film 71 is, for example, a COF (Chip on Film) on which the driver IC 72 is mounted.

The driver IC 72 is connected to the external electrodes via the wiring film 71. The driver IC 72 may be connected to the external electrodes by other means such as ACP (anisotropic conductive paste), NCF (non-conductive film), and NCP (non-conductive paste) instead of the wiring film 71.

The driver IC 72 generates control signals and drive signals for applying to the piezoelectric columns 21 to operate the piezoelectric columns 21. The driver IC 72 generates control signals for controlling the timing of ejecting ink and the selection of a piezoelectric column 21 for ejecting ink according to image signals input from the control unit 150 of the liquid ejection apparatus 100. Also, the driver IC 72 generates a voltage to be applied to the piezoelectric column 21 according to the control signal, that is, a drive signal (electrical signal). When the driver IC 72 applies a drive signal to the piezoelectric column 21, the driven piezoelectric column 21 displaces the diaphragm 30 so that the volume of the pressure chamber 46 expands and contracts. As a result, the ink in the pressure chamber 46 experiences pressure vibrations (oscillations). Ink is ejected from the nozzles 51 due to the pressure vibrations. The liquid ejection head 1 may be configured to implement gradation expression by changing the amount (size, volume, number) of ink droplets that land on one pixel. Further, the liquid ejection head 1 may provide pixel gradation by changing the number of ink ejection times. Thus, the driver IC 72 is an example of an application unit that applies the drive signal to the piezoelectric column 21.

Next, an example of the drive circuit 70 will be described by reference to FIG. 3. The drive circuit 70 includes in a driver IC 72, a voltage control unit 724 and a total number of voltage switching units 725 equal to the number of the pressure chambers 46. However, in FIG. 3, just two voltage switching units 725 are illustrated for convenience, and the illustration of the other voltage switching units 725 is omitted.

The drive circuit 70 is connected to a first voltage source 81, a second voltage source 82, and a third voltage source 83. The drive circuit 70 applies the voltage supplied from the first voltage source 81 to each wiring electrode 726. The drive circuit 70 selectively applies the voltages supplied from the first voltage source 81, the second voltage source 82, and the third voltage source 83 to each wiring electrode 727. Here, if the actuator 20 is a stacked PZT, the actuator 20 tends to deteriorate if voltages of both polarities are applied. The voltages supplied from the first voltage source 81, the second voltage source 82, and the third voltage source 83 can be the ground voltage and the polarity of either plus or minus with respect to the ground voltage.

The output voltage of the first voltage source 81 is, for example, the ground voltage, and its voltage value is V0 (V0=0 volts (V)). Also, the voltage value indicated by the output voltage of the second voltage source 82 is assumed to be V1. The voltage value V1 is set to a voltage larger than V0. The voltage value indicated by the output voltage of the third voltage source 83 is assumed to be V2. For example, the voltage value V2 is larger than V0 but less than V1.

The wiring electrode 726 is connected to the common electrode serving as the ground electrode of the actuator 20. A plurality of wiring electrodes 727 are connected to individual electrodes as non-ground electrodes of the actuator 20.

The voltage control unit 724 is connected to each of the voltage switching units 725. The voltage control unit 724 outputs to each voltage switching unit 725 a command (signal) indicating which voltage source is to be selected from among the first voltage source 81, the second voltage source 82, and the third voltage source 83. For example, the voltage control unit 724 receives an image signal from the control unit 150 and determines the switching timing of the voltage sources for each voltage switching unit 725. Then, the voltage control unit 724 outputs a command to select one of the first voltage source 81, the second voltage source 82, and the third voltage source 83 to the voltage switching unit 725 at the determined switching timing. The voltage switching unit 725 switches the voltage source to be connected to the wiring electrode 727 according to the command from the voltage control unit 724.

The voltage switching unit 725 is composed of, for example, a semiconductor switch. The voltage switching unit 725 connects one of the first voltage source 81, the second voltage source 82, and the third voltage source 83 to the wiring electrode 727 under the control of the voltage control unit 724. Therefore, the internal electrodes of the piezoelectric column 21 having different polarities are connected to the wiring electrodes 726 and 727 via the external electrodes (common electrode and individual electrode).

Such a drive circuit 70 switches the connection wiring between the voltage sources 81, 82, and 83 and the actuator 20 by a switching circuit comprising the voltage control unit 724 and the plurality of voltage switching units 725 to input drive waveforms having at least three potential differences between the electrodes of the actuator 20 as drive signals. Here, the drive waveform is an ejection waveform for ejecting droplets by driving the actuator 20. In the present description, potential differences other than the largest potential difference and the smallest potential difference are called intermediate potential differences.

The printed wiring board in this example can be a PWA (Printing Wiring Assembly) on which various electronic components and connectors are mounted. The printed wiring board is connected to the control unit 150 of the liquid ejection apparatus 100.

Next, an example of the liquid ejection apparatus 100 including a liquid ejection head 1 will be described with reference to FIGS. 4 and 5. The liquid ejection apparatus 100 is, for example, an inkjet recording device or a printer. The liquid ejection apparatus 100 includes a housing 111, a medium supply unit 112, an image forming unit 113, a medium discharge unit 114, and a conveying device 115. The liquid ejection apparatus 100 also includes the control unit 150 therein.

The liquid ejection apparatus 100 performs an image forming process on paper P by ejecting ink or the like while conveying a print medium (paper P) along a predetermined conveyance path A from the medium supply unit 112 through the image forming unit 113 to the medium discharge unit 114.

The housing 111 constitutes the outer shell of the liquid ejection apparatus 100. A discharge port for discharging the paper P to the outside is provided at a predetermined position of the housing 111.

The medium supply unit 112 includes a plurality of paper feed cassettes and is configured to be able to hold a plurality of sheets of paper P of various sizes.

The medium discharge unit 114 includes a paper discharge tray configured to be able to hold the paper P discharged from the discharge port.

The image forming unit 113 includes a support unit 117 that supports the paper P, and a plurality of head units 130 arranged above the support unit 117.

The support unit 117 includes a conveying belt 118 provided in a loop shape, a support plate 119 for supporting the conveying belt 118 from the back side, and a plurality of belt rollers 120 provided on the back side of the conveying belt 118.

During image formation, the support unit 117 supports the paper P on the holding surface, which is the upper surface of the conveying belt 118, and sends the conveying belt 118 at a predetermined timing by the rotation of the belt roller 120, thereby conveying the paper P to the downstream side.

Each head unit 130 includes a liquid ejection head 1, an ink tank 132 mounted on the liquid ejection head 1, a connection channel 133 connecting the liquid ejection head 1 and the ink tank 132, and a supply pump 134.

In the present embodiment, a plurality of head units 130 are provided. Each head unit 130 uses ink of a different color. For example, the plurality of head units 130 includes liquid ejection heads 1 for four colors of cyan, magenta, yellow, and black. Ink tanks 132 that respectively contain inks of these colors are provided. Each ink tank 132 is connected to the common channel 48 of a liquid ejection head 1 by the connection channel 133.

A negative pressure control device such as a pump or the like can be connected to each ink tank 132. A meniscus of the ink supplied to each nozzle 51 of the liquid ejection head 1 is formed and maintained in a predetermined shape by negative pressure control in the ink tank 132 corresponding to the head value (hydrostatic pressure) of the liquid ejection head 1 and the ink tank 132.

The supply pump 134 is, for example, a piezoelectric pump. The supply pump 134 is provided in the supply channel. The supply pump 134 is connected to the control unit 150 by wiring and controlled by the control unit 150. The supply pump 134 supplies liquid to the liquid ejection head 1.

The conveying device 115 conveys the paper P along the conveyance path A from the medium supply unit 112 to the medium discharge unit 114 through the image forming unit 113. The conveying device 115 includes a plurality of guide plate pairs 121 arranged along the conveyance path A and a plurality of conveying rollers 122.

The plurality of guide plate pairs 121 each includes a pair of plate members arranged to face each other with the conveyed paper P interposed therebetween, and guides the paper P along the conveyance path A.

The conveying roller 122 is rotated under the control of the control unit 150 to convey the paper P along the conveyance path A to the downstream side. Sensors for detecting the conveyance status of the paper P are arranged at various locations along the conveyance path A.

The control unit 150 is, for example, a control board. The control unit 150 has a processor 151, a ROM (Read Only Memory) 152, a RAM (Random Access Memory) 153, an I/O port 154 (input/output port), and an image memory 155.

The processor 151 is a processing circuit such as a CPU (Central Processing Unit) which may also be referred to as a controller. The processor 151 controls the head units 130, a drive motor 161, an operation unit 162, various sensors 163, and the like provided in the liquid ejection apparatus 100. The processor 151 transmits the print data stored in the image memory 155 to the drive circuit 70 in the appropriate drawing order.

The ROM 152 stores various programs and the like. The RAM 153 temporarily stores variable data, image data, and the like. The ROM 152 and the RAM 153 are examples of storage media, and other storage media may be used as long as they can store the various programs, data, and the like. The I/O port 154 is an interface unit that receives data from the outside such as an externally connected device 200 and outputs data to the outside. Print data from the externally connected device 200 is transmitted to the control unit 150 through the I/O port 154 and stored in the image memory 155.

The characteristics of the liquid ejection head 1 used in the liquid ejection apparatus 100 according to the present embodiment and the drive waveform (ejection waveform of the drive signal) of the liquid ejection head 1 will be described below.

Figure 6:
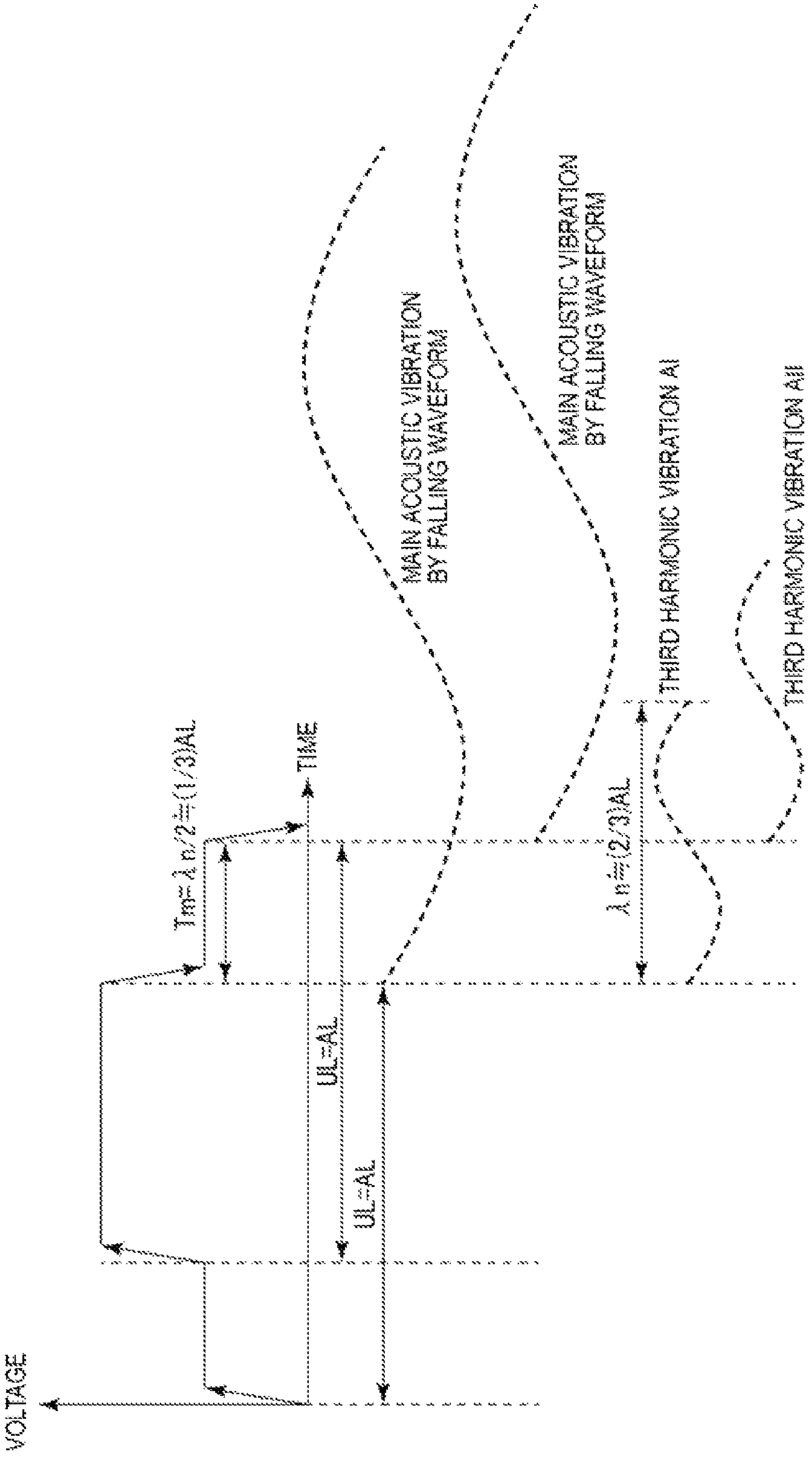
FIG. 6 depict examples of drive waveforms and acoustic vibrations of a liquid ejection head.
Figure 8A:
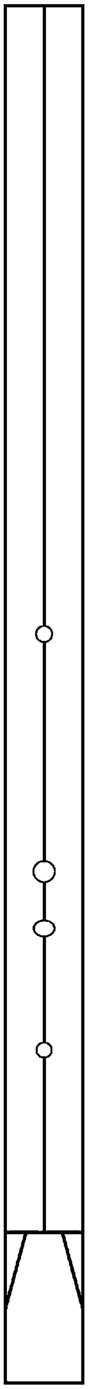
FIGS. 8A to 8C are explanatory diagrams concerning examples of droplets ejected from a liquid ejection head.
Figure 8B:
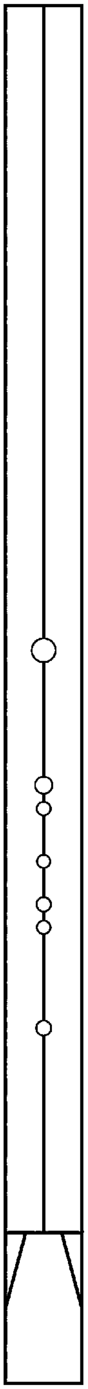
Figure 8C:
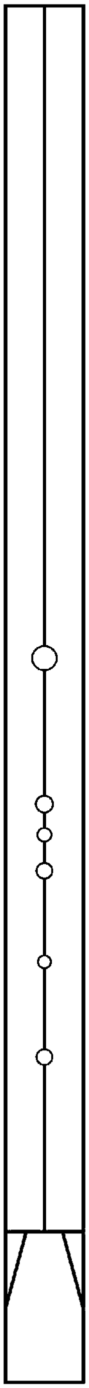
Figure 9:
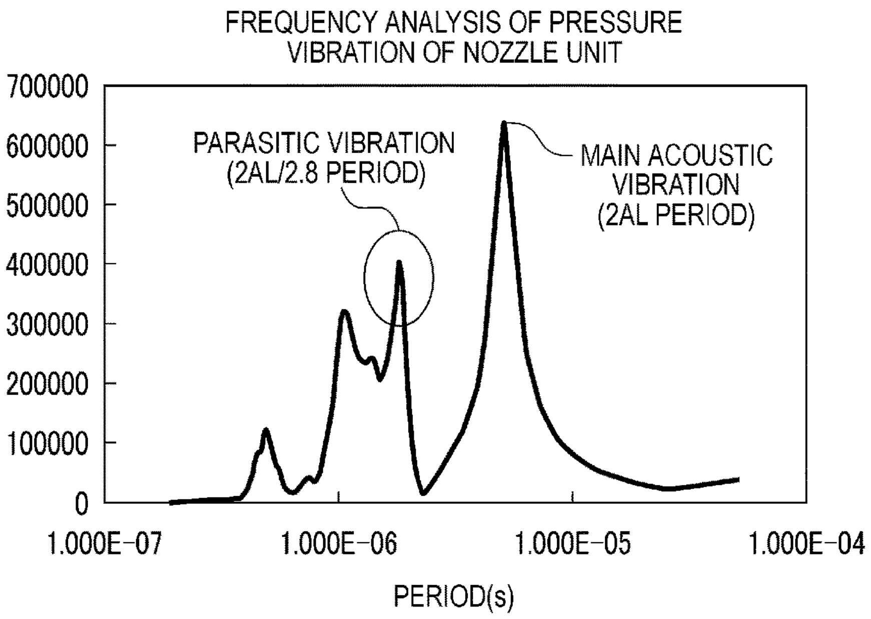
FIG. 9 depicts an example of a frequency analysis of a liquid ejection head according to a comparative example.
Figure 10:
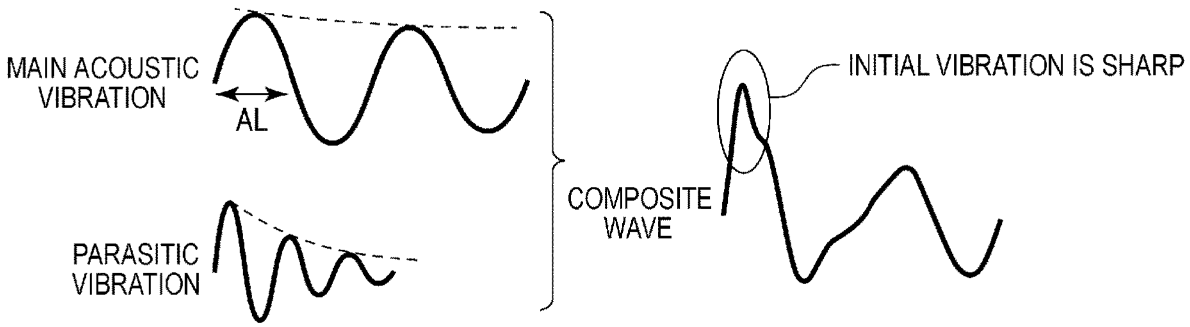
FIG. 10 is diagram for explaining a composite wave formed by a main acoustic vibration and a parasitic vibration of a liquid ejection head.
Figure 11:
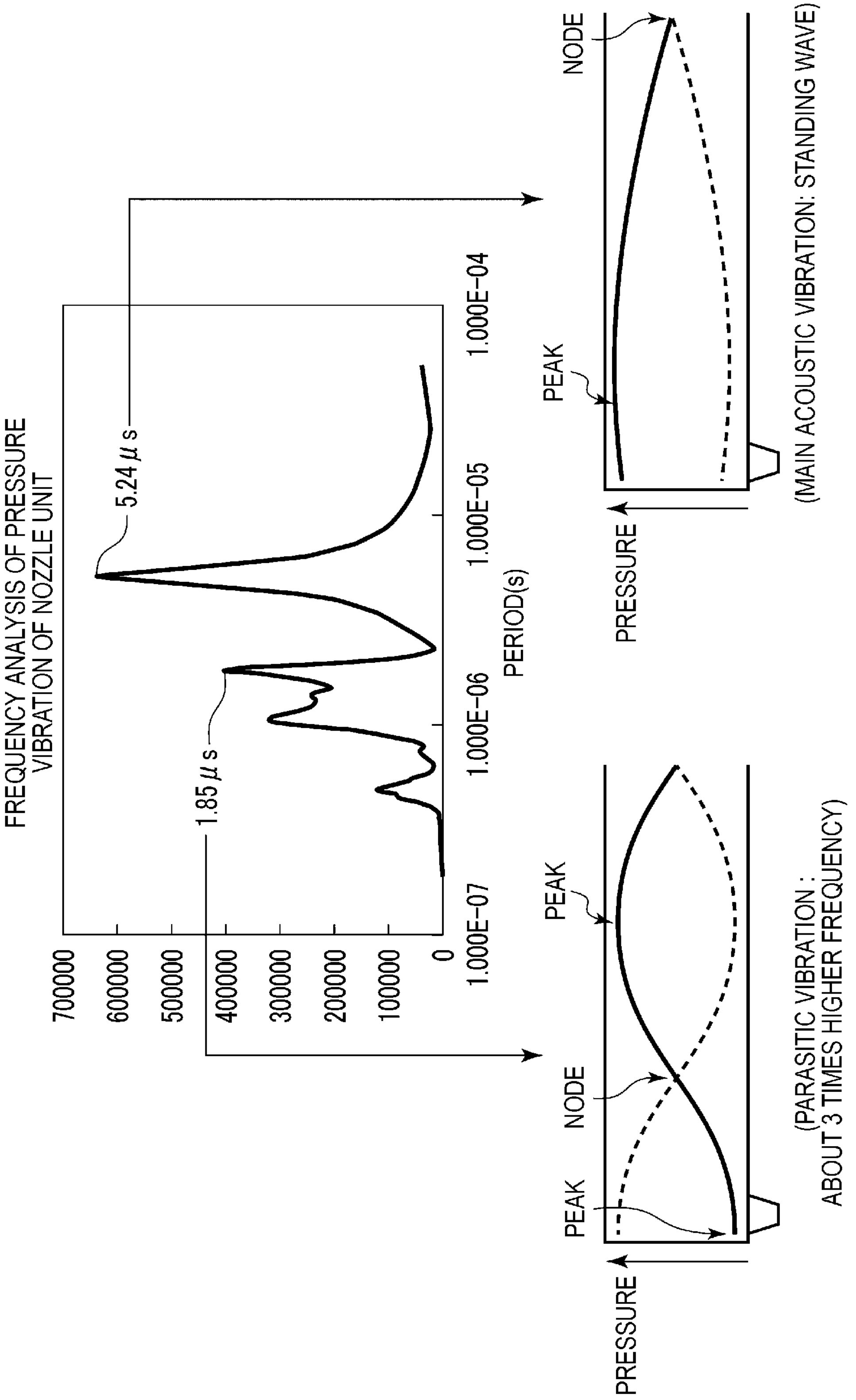
FIG. 11 depicts an example of a frequency analysis of a liquid ejection head according to a comparative example.
Figure 12:
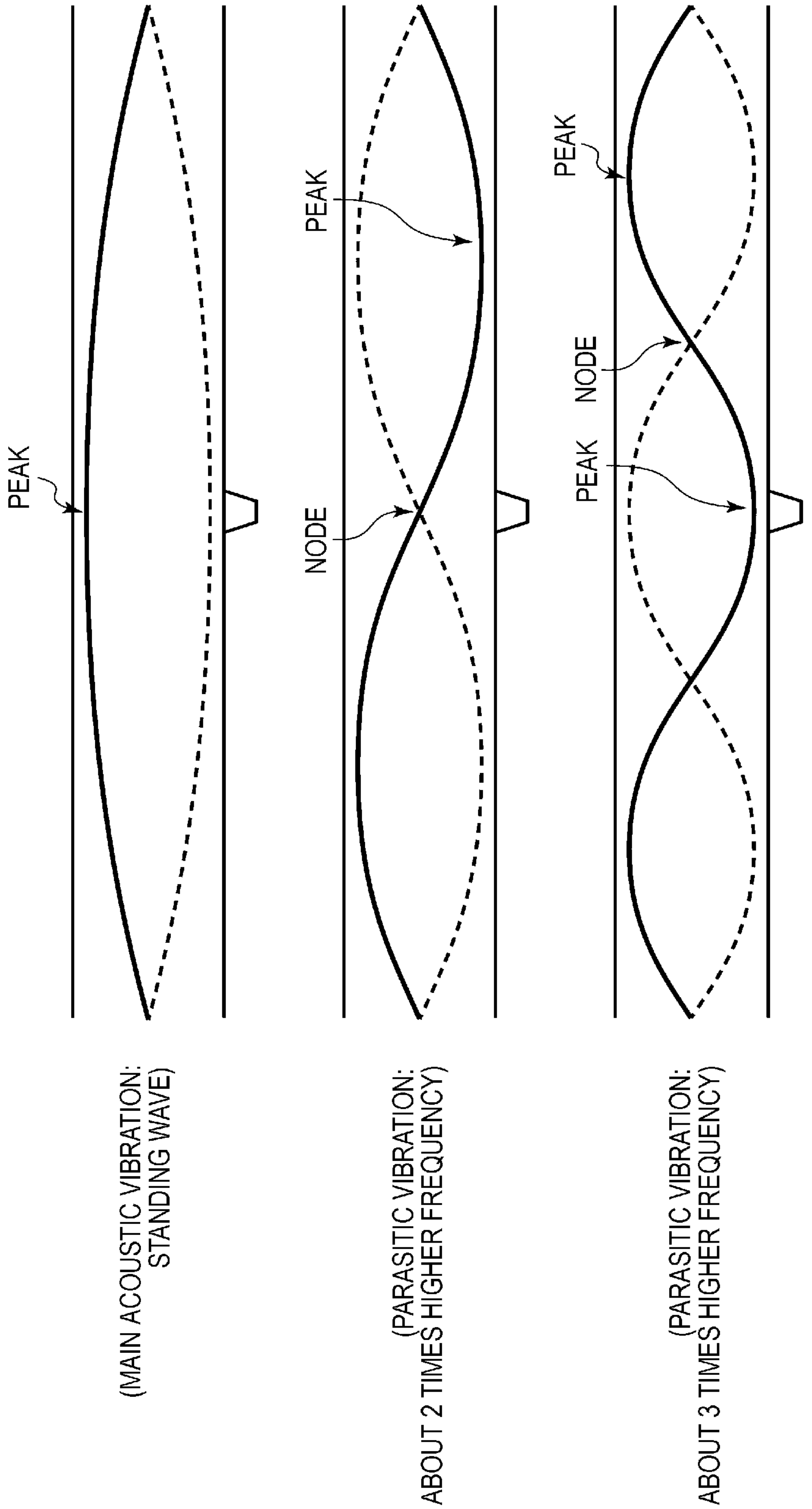
FIG. 12 is an explanatory diagram for drive waveforms and acoustic vibrations of a liquid ejection head.
Figure 13:
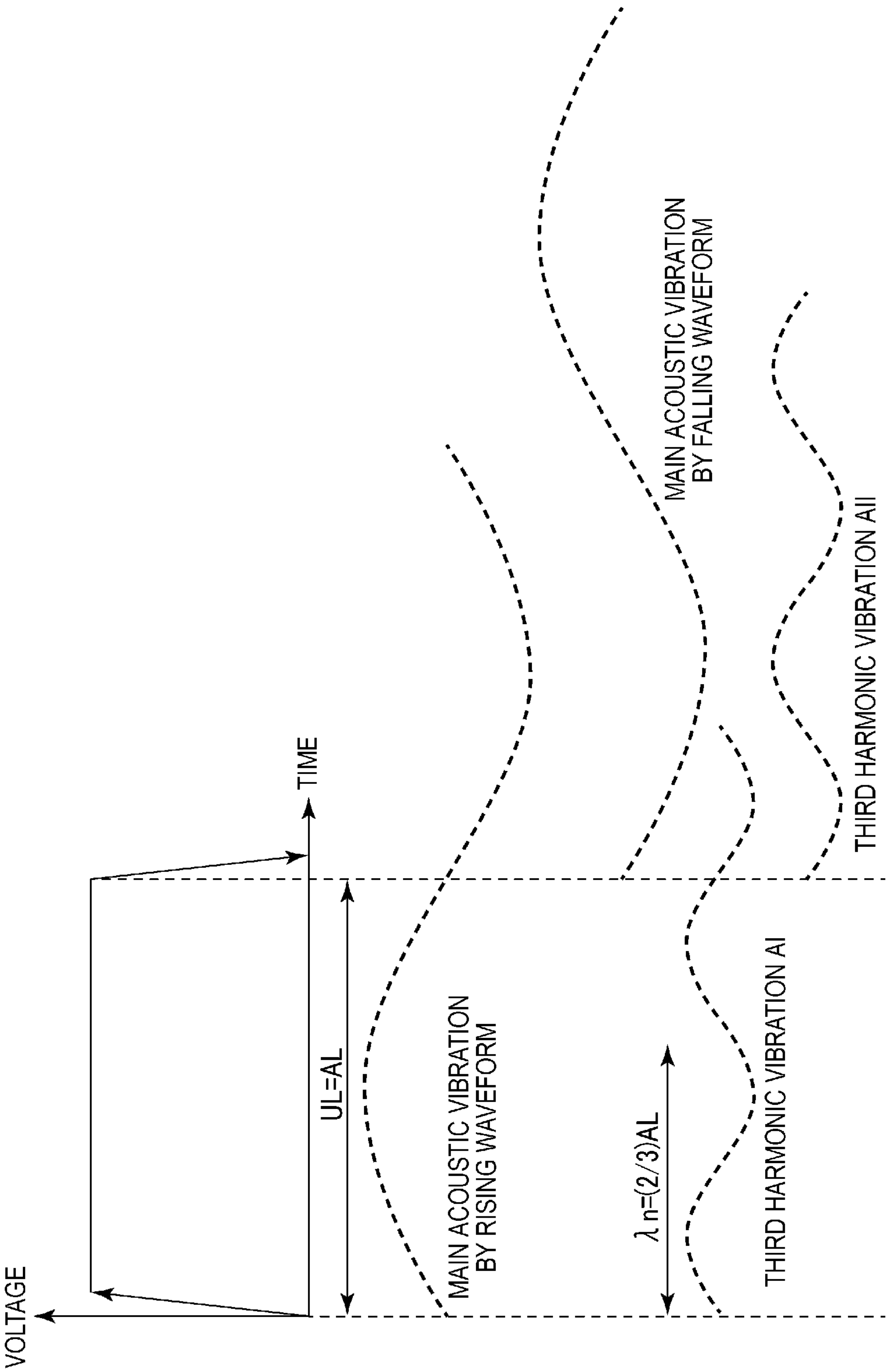
FIG. 13 is an explanatory diagram for drive waveforms and acoustic vibrations of a liquid ejection head.

First, drive waveforms of the liquid ejection head 1 of the present embodiment will be described with reference to FIGS. 6 to 13. FIG. 6 is an explanatory diagram showing an example of drive waveforms and acoustic vibrations of the liquid ejection head 1 according to this embodiment, and FIG. 7 is a table showing the relationship between the drive waveforms and the ejected droplets for an example of the liquid ejection head 1. FIGS. 8A to 8C are explanatory diagrams showing examples of droplets ejected from the liquid ejection head 1. FIGS. 9 to 13 are drawings related to a conventional liquid ejection head of a comparative example. FIG. 9 is an explanatory diagram showing an example of frequency analysis of pressure vibration of the liquid ejection head according to the comparative example. FIG. 10 is an explanatory diagram showing a composite wave example in which a main acoustic vibration and a parasitic vibration are added. FIG. 11 is an explanatory diagram showing an example of frequency analysis of the liquid ejection head according to the comparative example. FIG. 12 is an explanatory diagram showing an example of drive waveforms and acoustic vibrations of a liquid ejection head according to the comparative example. FIG. 13 is an explanatory diagram showing an example of drive waveforms and acoustic vibrations of a liquid ejection head according to the comparative example.

A liquid ejection head of the comparative example employs a drive method called a pull strike method that increases the ejection force by driving the piezoelectric columns 21 in accordance with the half period AL (acoustic length) of the main acoustic vibration of the pressure chamber. However, as shown in the example of frequency analysis of pressure vibration of the nozzle unit in FIG. 9, if a droplet is ejected from a nozzle by the driving of the liquid ejection head (actuator), in addition to the main acoustic vibration due to the fluidic vibration of the ink, a parasitic vibration may occur in a frequency range higher than the main acoustic vibration of the pressure chamber.

If a droplet is ejected from a nozzle by driving of an actuator, if a parasitic vibration with a frequency higher than that of the main acoustic vibration occurs, pressure peaks having a shorter period than the half period of the main acoustic vibration occur in the pressure chamber as shown in FIG. 10. That is, the composite wave obtained by composing the main acoustic vibration and the parasitic vibration has a sharp initial vibration. A pressure peak with a short period increases the ejection speed of the leading end portion of an ejected droplet, but does not last to the end of the ejection and thud lowers the ejection speed of the trailing end portion of the ejected droplet. As shown in FIG. 8A, when the droplet is ejected in this manner, the volume of the satellites with respect to the leading end (first) droplet increases, resulting in a deterioration of print quality. Here, a satellite is a droplet that is ejected after the first ejected droplet (leading end droplet) when liquid is being ejected from a nozzle by the driving of the piezoelectric column 21 and deforming of the pressure chamber 46.

In a liquid ejection head in the comparative example, as shown in the frequency analysis of FIG. 11, a parasitic vibration having about three times (for example, 2.8 times) higher frequency occurs in addition to the main acoustic vibration. Here, the causes of parasitic vibration having a higher frequency than the main acoustic vibration are considered as follows.

An example of the cause is the vibration of an odd multiple of 3 or more in the liquid column vibration of the closed tube, as shown in FIG. 11, is that the liquid ejection head is an end shooter type having a connection point with the common channel as an open end, similar to liquid ejection head 1 of an embodiment.

Another example of the cause is the vibration of an integer multiple of 2 or more in the liquid column vibration of the open tube as shown in FIG. 12, is that the liquid ejection head is a side shooter type having a connection point with the common channel as an open end. In the main acoustic vibration of the open tube, the amplitude of the pressure vibration is greatest at the center of the open tube, and thus, the nozzle is usually provided near the center of the open tube. As shown in FIG. 12, if the vibration of an even multiple of 2 or more occurs in the liquid column vibration of the open tube, the center of the open tube becomes a vibration node with a small amplitude of pressure vibration. Therefore, if the nozzle is provided near the center of the open tube, the shape of the ejected droplet is less affected by the vibration of an even multiple of 2 or more. For this reason, if the nozzle is provided near the center of the open tube, the vibration of an odd multiple of 3 or more is likely to be the cause of deterioration of the print quality by increasing the volume of the satellites rather than the vibration of an even multiple of 2 or more.

Another example of the cause is vibration caused by the reflection of the pressure vibration due to the change in the sound velocity of each channel when the pressure chamber and the individual channel have different channel cross-sections.

In addition, another example of the cause is the vibration caused by the pressure generated in the pressure chamber decompressing in the low-rigidity channel, creating pressure vibration nodes between the pressure chamber and the low-rigidity channel if the rigidity of the wall surface or part of the wall surface of the individual channel is smaller than that of the pressure chamber. This is, for example, the case where the installation range of the actuator (piezoelectric column 21) such as PZT indicated by the two-dot chain line in FIG. 1 is deviated from the range of the diaphragm on the wall surface of the pressure chamber due to the manufacturing errors (tolerances) or the like, as in the actuator (piezoelectric column 21) indicated by the solid line in FIG. 1, and the area of the wall surface of the pressure chamber 46 where the actuator is not supported by the diaphragm alone is relatively large. Further, the results of the frequency analysis of the nozzle unit pressure vibration of the head when the range where the actuator is not supported only by the upper right diaphragm of the pressure chamber in FIG. 1 is a range of less than 30% of the length in the longitudinal direction of the pressure chamber (the lateral width of the pressure chamber 46 in FIG. 1) are the graphs shown in FIGS. 9 and 11. FIGS. 9 and 11 shows the results of the frequency-analysis of the nozzle unit pressure vibration when a simulation is performed in which the deformation of the PZT and the pressure chamber was structurally analyzed along with the behavior of the liquid in the flow path as compressive fluid and the liquid droplet ejection from the nozzle.

As shown in FIG. 13, if the rectangular wave width UL of the ejection waveform is equal to the acoustic length (AL), the third harmonic vibration AI generated by the pressure chamber expansion (rising waveform) in advance before ejection, and the third harmonic vibration AII of the liquid column vibration due to the pressure chamber contraction during ejection (falling waveform) are reinforced, and thus, the third harmonic vibration causes a pressure peak of a short period, resulting in deterioration of print quality.

Next, an example of the drive of the liquid ejection head 1 of the present embodiment and the drive waveform will be described. In the present embodiment, the pressure vibration of the pressure chamber 46 of the liquid ejection head 1 is likened to the liquid column vibration of a closed tube, and the acoustic resonance frequency (parasitic vibration) in the frequency range higher than the main acoustic resonance frequency (main acoustic vibration) of the liquid in the pressure chamber 46 is assumed to be a drive waveform that suppresses third harmonic vibration that is approximately an odd multiple of approximately 3 times or more of the main acoustic resonance frequency. Here, "approximately 3 times" includes 2.8 times as shown in FIG. 9.

First, in the liquid ejection head 1, the piezoelectric column 21 of the actuator 20 expands the pressure chamber 46 the most when the potential difference is the largest, and the piezoelectric column 21 of the actuator 20 contracts the pressure chamber 46 for ink the least when the potential difference is the smallest. When ink is ejected from the liquid ejection head 1, the pressure chamber 46 is expanded before ejection, and then contracted at the time for ejection to perform the ejection of the ink. In the present embodiment, the drive waveform of the liquid ejection head 1 is such that the potential difference including the intermediate potential difference (expansion potential difference) is increased two times in succession when the pressure chambers 46 are expanded in advance of ejection, or the potential difference including the intermediate potential difference (contraction potential difference) is reduced two times (or more) in succession when the pressure chamber 46 is contracted during ejection. More preferably, the drive waveform changes the potential difference twice during both expansion and contraction of the pressure chamber 46. In the case where the pressure chamber expands when the voltage (potential difference) is reduced, the voltage (potential difference) is increased in order to contract the pressure chamber before the ejection waveform is input. Next, the pressure chamber is expanded twice in succession by changing the voltage (potential difference) in two stages in the ejection waveform. When the pressure chamber 46 is contracted at the time of ejection, the pressure chamber is contracted twice in succession by reducing the voltage (potential difference) twice. In this case, since the voltage (potential difference) for expanding the pressure chamber in the discharge waveform is divided into two and the potential from the time when the voltage is reduced to the time immediately before the time when the pressure chamber starts to contract is the lowest potential in the drive waveform, these potentials are set to the ground voltage, and the other potentials are set to potentials higher than the ground voltage.

FIG. 6 shows an example of drive waveforms when ink is ejected from the liquid ejection head 1. In FIG. 6, the vertical axis is voltage (potential difference) and the horizontal axis is time. The drive waveform is generated by the driver IC 72 of the drive circuit 70. As shown in FIG. 6, the drive waveform increases the expansion potential difference in two stages when the pressure chamber 46 expands and decreases the contraction potential difference in two stages when the pressure chamber 46 contracts during ejection. When changing the potential difference (both when expanding and contracting the pressure chamber 46), the first potential difference is maintained for a predetermined time, and then the second potential difference is applied.

As shown in FIG. 6, when the pressure chamber 46 is expanded in advance before the ink is ejected, the time interval from the start of expansion by the first expansion potential difference to the start of contraction by the first contraction potential difference after the expansion potential difference was increased twice in succession is equal to UL. As shown in FIG. 6, when the pressure chamber 46 is contracted during ejection, the time interval from the expansion start time point by a second expansion potential difference when the potential difference is continuously increased twice before being decreased to a contraction start time point by the second contraction potential difference when the contraction potential difference is continuously decreased twice after the expansion potential difference is continuously increased twice is equal to UL.

That is, as shown in FIG. 6, the drive waveform to eject ink from the nozzle 51 changes the potential difference twice for both the expansion and contraction of the pressure chamber 46. The time interval from the first time the potential difference is increased is set to be UL. And the time interval between a second expansion start point at which the potential difference is continuously increased twice during expansion of the pressurizing chamber 46 and a second contraction start point at which the potential difference is continuously decreased twice during contraction of the pressurizing chamber 46 is defined as UL. The time interval UL is greater than 0.5 AL (one-half AL) but less than 1.5 AL (1.5×AL). More preferably, UL=AL. A reinforcement occurs due to the main acoustic vibration generated by expanding the pressure chamber 46 in advance before ejection and the main acoustic vibration generated by contracting the pressure chamber 46 during ejection when UL is greater than 0.5 AL but less than 1.5 AL.

Here, in the drive waveform, Tm=λn/2 where the period of parasitic vibration (such as the third harmonic) is λn, and the time interval between the first potential difference change start time and the second potential difference change start time when the potential difference is increased twice consecutively or when the potential difference is reduced twice is Tm. If the piezoelectric column 21 (actuator) is driven with such a drive waveform, as shown in FIG. 6, the phase difference between the parasitic vibration generated at the time of the first change of the potential difference and the parasitic vibration generated at the time of the second change of the potential difference is 180 degrees and cancel each other out. As a result, deterioration of print quality due to parasitic vibration such as third harmonics can be suppressed.

More preferably, as shown in FIG. 6, in the drive waveform, by setting the size of the first potential difference change and the size of the second potential difference change to be the same, the parasitic vibrations having substantially the same amplitude and a phase difference of 180 degrees in the pressure chamber 46 cancel each other out, and the residual vibration derived from the subsequent parasitic vibrations can be greatly suppressed.

In this way, when the time interval UL of the ejection waveform (drive waveform) when the potential difference is increased twice consecutively or decreased twice consecutively is set to AL, and the time interval Tm is set to λn/2, as shown in FIG. 6, the phase difference between the parasitic vibration (third harmonic vibration AI) generated by the pressure chamber contraction (falling waveform) at the time of the first potential difference change and the parasitic vibration (third harmonic vibration AII) generated by the pressure chamber contraction (falling waveform) at the time of the second potential difference change becomes 180 degrees, and they cancel each other. Similarly, the parasitic vibration (third harmonic vibration AI) generated by the pressure chamber expansion (rising waveform) at the time of the first potential difference change and the parasitic vibration (third harmonic vibration AII) generated by the pressure chamber expansion (rising waveform) at the time of the second potential difference change have a phase difference of 180 degrees and cancel each other out. Further, by setting UL to AL, the main acoustic vibration generated by the expansion (rising waveform) of the pressure chamber in advance before ejection and the main acoustic vibration generated by the contraction (falling waveform) of the pressure chamber at the time of ejection strengthen each other, and the ejection force by the main acoustic vibration is increased. In the case where the pressure chamber expands when the voltage (potential difference) is reduced, the voltage (potential difference) is increased in order to reduce the pressure chamber before the ejection waveform is input. Next, the pressure chamber is expanded twice by reducing the voltage (potential difference) twice by the ejection waveform input, and the pressure chamber is contracted by reducing the voltage (potential difference) twice when the pressure chamber 46 is contracted at the time of ejection.

Here, the condition of Tm under which the parasitic vibrations of the period λn weaken each other in the drive waveform will be described. First, the vibration with the period λn generated at the time of the first potential difference change is set to be A, and the vibration vector of A after time Tm is set to be A'. The vibration vector with the period λn generated at the second potential difference change after Tm is set to B. If Tm is an odd multiple of λn/2 (the phase difference between A' and B is 180 degrees), the absolute value of the combined vector of A' and B is minimized. In a condition which is obtained from the formula for the composition of simple harmonic motions with the period λn and under which the absolute value of the combined vector of A' and B is equal to or less than the larger one of absolute values of A' and B, (when the absolute value of A' and the absolute value of B are the same, it is equal to or less than that) the phase difference between vibration vectors A' and B is within 180 degrees±60 degrees.

The absolute value of the combined vector of A' and B can be transformed into the following formula. Here, if θA is the phase of A' and θB is the phase of B, then the absolute value of the combined vector of A' and B is Formula 1:

$$\sqrt{(|A'|^2+|B|^2+2*|A'|*|B|*\cos(\theta A-\theta B))}$$

Here, if |A'|≤|B|, the phase difference (θA−θB) between A' and B satisfying |B|≥Formula 1 is a condition for the vibrations of the period λn to weaken each other. If the relationship |B|≥Formula 1 is transformed by squaring both sides, 0≥|A'|+2*|B|*cos(θA−θB) (Formula 2) is obtained. From the above, if the phase difference (θA−θB) between A' and B is within the range of 180 degrees±60 degrees, Formula 2 is satisfied.

In the case of |B|≤|A'|, if the relationship |A'|≥Formula 1 is transformed by squaring both sides, then 0≥|B|+2*|A'|*cos(θA−θB) (Formula 3) is obtained. From the above, if the phase difference (θA−θB) between A' and B is within the range of 180 degrees±60 degrees, Formula 3 is satisfied.

From these, the condition under which the parasitic vibrations of the period λn weaken each other is:

(k/2−1/6)λn≤Tm≤(k/2+1/6)λn (Formula 4), where k is an odd number of 1 or more.

Further, if the potential difference is changed twice during both expansion and contraction of the pressure chamber 46, Tm of the drive waveform is preferably in the range:

(k/2−1/6)λn≤Tm≤(k/2+1/6)λn (where k is an odd number of 1 or more) at the intermediate potential difference retention time during the expansion of the pressure chamber and the intermediate potential difference retention time during contraction of the pressure chamber.

In addition, a shorter Tm is desirable from the viewpoint of reducing power consumption by reinforcing the main acoustic vibrations generated if the intermediate potential difference changes from the previous potential difference and if the intermediate potential difference changes to the next potential difference.

From the above points, when considering the reduction of power consumption, the Tm of the drive waveform is:

(k/2−1/6)λn≤Tm≤kλn/2 (Formula 5), where k is an odd number of 1 or more.

Next, as an evaluation of the drive waveform of the liquid ejection head 1 according to the present embodiment, FIG. 7 shows the results if the liquid ejection head 1 with 2AL=5.24 μs is driven with various waveforms and one drop of ink is ejected. In addition, the voltage was adjusted so that the leading droplet velocity was about 8 m/s in all the results of various waveforms in FIG. 7.

The drive waveform at the top in FIG. 7 is, as a comparative example, a trapezoidal drive waveform with a rise time tr of 0.2 μs as shown in FIG. 13, and the others are drive waveforms in which the potential difference is changed twice as shown in FIG. 6. Tm was set to be different, and the rise times were all set to 0.2 μs. Also, the ejection voltage indicates the difference between the expansion potential difference and the contraction potential difference. The intermediate potential difference is an intermediate value between the expansion potential difference and the contraction potential difference.

In the liquid ejection head 1 of the embodiment and the liquid ejection head of the comparative example, as shown in the frequency analysis of FIG. 11, parasitic vibrations having about three times higher frequency than the main acoustic vibrations occur. The period λn of parasitic vibration is 1.85 μs and λn/2 is 0.925 μs.

Also, FIGS. 8A to 8C show the results of simulation of the state of the ejected droplets if one drop of ink is ejected. FIG. 8A is an example showing an ejected droplet by a trapezoidal drive waveform with tr=0.2 μs in the comparative example, and FIG. 8B is an example showing an ejected droplet by a drive waveform that changes the potential difference twice with Tm=0.62 μs in the embodiment and FIG. 8C is an example showing an ejected droplet by a drive waveform that changes the potential difference twice with Tm=0.93 μs in the embodiment.

As shown in FIGS. 7 and 8C, the waveform with Tm=0.93 μs, which is closest to the half period of the parasitic vibration, has the largest ratio of the leading droplet volume to the total ejection volume, and as shown in FIGS. 7 and 8B, it can be seen that the leading droplet volume ratio decreases as Tm deviates from 0.925 μs. Also, it can be seen that the smaller the Tm, the lower the ejection voltage per unit volume (ejection voltage/total ejection volume). These results also show that the drive waveform of the liquid ejection head 1 of the embodiment can suppress vibrations of a frequency higher than the main acoustic vibration while suppressing power consumption.

As described above, with the liquid ejection head 1 according to the embodiment, by changing the potential difference of the drive waveform for driving the actuator 20 in two stages including the intermediate potential difference, and thus, it is possible to suppress the deterioration of print quality due to the vibration having a frequency higher than the main acoustic vibration while suppressing the power consumption.

The embodiments are not limited to the examples described above. That is, the drive waveform used for droplet ejection by the liquid ejection head 1 includes an intermediate potential difference, and at least the potential difference (expansion potential difference) may be increased in increments a plurality of times when the pressure chamber 46 is expanded before ejection or the potential difference (contraction potential difference) may be decreased in increments a plurality of times when the pressure chamber 46 is contracted during ejection.

Figure 14:
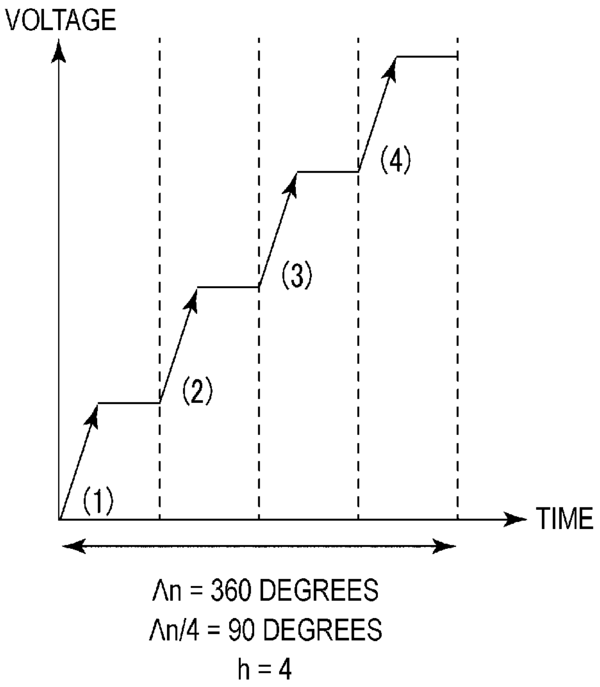
FIG. 14 depicts an example of drive waveforms according to another embodiment.

As another embodiment, the drive waveform for the liquid ejection head 1 in which the potential difference (expansion potential difference) of the drive waveform of the drive circuit 70 is increased h times, which is two times or more, in succession will be described using FIGS. 14 and 15.

In the drive waveform of the liquid ejection head 1 of the embodiment, assuming that one of the first to h−1-th potential difference changes is the i-th potential difference change, one of the i+1-th to h-th potential difference changes is the j-th potential difference change, and the time interval between the i-th and j-th potential difference change start times is Tij, one of the time intervals Tij is:

$(k/2-1/6)\lambda n \le Tij \le (k/2+1/6)\lambda n$ (Formula 6), where k is an odd number of 1 or more.

According to the drive waveform that satisfies Formula 6, the parasitic vibrations of period λn caused by the corresponding potential difference changes two or more times weaken each other, and the parasitic vibrations of the period λn occurring in the pressure chamber can be suppressed. This is the same if the number of times the pressure chamber 46 is contracted and changed is h times, which is three times or more.

Also, if i+1=j, that is, if Tij is the time interval between successive potential difference changes and considering the reduction of power consumption, the time interval Tij is desirably:

$(k/2-1/6)\lambda n \le Tij \le k\lambda n/2$ (Formula 7), where k is an odd number of 1 or more.

In addition, if another potential difference change in which the time interval Tij satisfies:

$(k/2-1/6)\lambda n \le Tij \le (k/2+1/6)\lambda n$ (where k is an odd number of 1 or more), or $(k/2-1/6)\lambda n \le Tij \le k\lambda n/2$ (where k is an odd number of 1 or more) is present among all of the first to h-th potential difference changes, the parasitic vibration with the period λn occurring in the pressure chamber 46 can be further suppressed.

Also, by making the size of the potential difference change between the i-th and j-th potential difference changes at the time interval Tij (that satisfies $(k/2-1/6)\lambda n \le Tij \le (k/2+1/6)\lambda n$ (where k is an odd number of 1 or more)) the same, it is possible to further suppress the residual vibration derived from the subsequent parasitic vibration. More preferably, the optimum retention time of each stage is λn/the number of stages (h) if it is assumed that the potential difference in each stage is the same and the pressure vibration is not attenuated, so the time interval Tij of all the successive potential difference changes only needs to be defined as λn/the number of stages (h).

In addition, from the viewpoint of reducing power consumption by reinforcing the main acoustic vibrations, in the drive waveform, if the number of potential difference changes that expand and change the pressure chamber is h times, it is desirable that the time interval Tij between the first potential difference change and the h-th potential difference change be within 0.5 times the main acoustic vibration period. This is because by setting the time interval Tij between the first potential difference change and the h-th potential difference change within 0.5 times the main acoustic vibration period, the main acoustic vibrations generated by all the first to h-th potential difference changes reinforce each other, which contributes to the reduction of power consumption.

Figure 15:
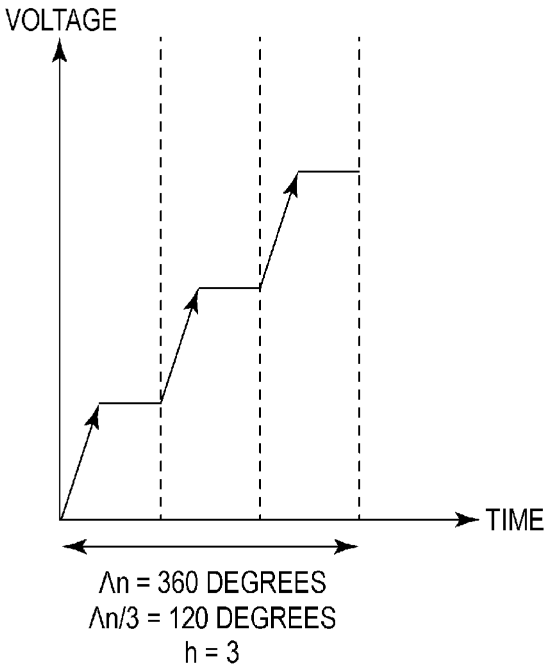
FIG. 15 depicts an example of drive waveforms according to another embodiment.

As examples of the drive waveforms described above, FIG. 14 shows an example in which the number of stages (number of times) of the rising waveform is four (4 increments) and FIG. 15 shows an example in which the number of stages of the rising waveform is three (3 increments. In FIG. 14, h, which is the number of stages, is shown in parentheses. The same structure applies to the falling waveform in reverse. As shown in FIGS. 14 and 15, the optimum retention time for each stage is λn/the number of stages (h), assuming that the potential difference in each stage is the same and the pressure vibration is not attenuated. Therefore, if the phase difference (time interval) of any two of the potential difference displacements from the first stage to the h-th stage is in the range from $(k/2-1/6)\lambda n$ to $(k/2+1/6)\lambda n$, the parasitic vibrations caused by the two corresponding potential difference displacements will weaken each other. For example, the time interval between the first and third potential difference changes in FIG. 14 is λ n/2, and Tij in the case of i=1 and j=3 satisfies Expression 6. Further, the time interval between the second and fourth potential difference changes in FIG. 14 is also λ n/2, and Tij in the case of i=2 and j=4 also satisfies Expression 6. Thus, the parasitic vibrations weaken each other.

The pressure vibration in the pressure chamber 46 is attenuated over time due to the viscous resistance of the ink. Also, parasitic vibrations are generally more attenuated over time than main acoustic vibrations. Therefore, the change in potential difference from 0.5AL before ejection to immediately after ejection has a greater impact on satellites and print quality than the change in the potential difference in the time range from 1.5AL before ejection to 0.5AL before ejection. The change in potential difference from 1.5AL before ejection to 0.5AL before ejection (the range in which the main acoustic vibrations reinforce each other) has a greater impact on satellites and print quality than the change in the potential difference in the time range before 1.5AL. Therefore, for the drive waveform, it is desirable that the value of Tm or Tij, which is closer to immediately before and immediately after ejection than any two of the time intervals of the potential difference change time be adjusted so that the parasitic vibration weakens each other.

With the liquid ejection head of at least one embodiment described above, deterioration of print quality due to the vibration having a frequency higher than the main acoustic vibration can be suppressed while suppressing the power consumption by including the intermediate potential difference in the potential difference of the drive waveform for driving the actuator and changing the potential difference in multiple stages.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid ejection head, comprising:

a nozzle plate including nozzles for ejecting liquid;

a plurality of pressure chambers communicating with the nozzles;

a plurality of actuators configured to vary the volume of the pressure chambers according to drive signals applied thereto; and a drive circuit configured to generates drive signals for driving the plurality of actuators, wherein the drive circuit generates a drive signal including an ejection waveform for an actuator with an expansion potential difference change that changes in stages and a contraction potential difference change that changes in stages, and sets the timing of the stages to cancels the vibration of an acoustic resonance frequency in a frequency range higher than a main acoustic resonance frequency of a liquid in the pressure chamber.

2. The liquid ejection head according to claim 1, wherein the number of stages in the expansion potential difference change is equal to the number of stages in the contraction potential difference change.

3. The liquid ejection head according to claim 1, wherein the magnitude of the expansion potential difference change is equal to the magnitude of the contraction potential difference change.

4. The liquid ejection head according to claim 1, wherein the stages are equal voltage increments in magnitude.

5. The liquid ejection head according to claim 1, wherein the number of stages in the expansion potential difference change is two, and the number of stages in the contraction potential difference change is two.

6. The liquid ejection head according to claim 1, wherein the number of stages in the expansion potential difference change is three, and the number of stages in the contraction potential difference change is three.

7. The liquid ejection head according to claim 1, wherein when the period of the acoustic resonance frequency is λn and the number of stages in each of the expansion and contraction potential difference changes is h, an i-th stage is any one of the h stages, and a j-th stage is another one of the h stages after the i-th stage, then the time interval Tij between the i-th potential difference change start time and the j-th potential difference change start time satisfies the relationship:

$(k/2-1/6)\lambda n \leq Tij \leq (k/2+1/6)\lambda n$, when k is an odd number of 1 or more.

8. The liquid ejection head according to claim 7, wherein the time interval Tij satisfies the relationship:

$$(k/2-1/6)\lambda n \leq Tij \leq k\lambda n/2.$$

9. The liquid ejection head according to claim 1, wherein the acoustic resonance frequency is an odd multiple of approximately three times or more of the main acoustic resonance frequency.

10. The liquid ejection head according to claim 1, wherein the drive circuit includes a switching circuit connecting electrodes of the actuator to a voltage source and generates the drive signal by switching of the switching circuit.

11. A liquid ejection apparatus, comprising:

an actuator configured to vary the volume of a pressure chamber according to drive signals applied thereto; and a drive circuit configured to supply drive signals for driving the actuator, wherein the drive circuit generates a drive signal including an ejection waveform for the actuator with an expansion potential difference change that changes in stages and a contraction potential difference change that changes in stages, and sets the timing of the stages to cancels the vibration of an acoustic resonance frequency in a frequency range higher than a main acoustic resonance frequency of a liquid in the pressure chamber.

12. The liquid ejection apparatus according to claim 11, wherein the number of stages in the expansion potential difference change is equal to the number of stages in the contraction potential difference change.

13. The liquid ejection apparatus according to claim 11, wherein the magnitude of the expansion potential difference change is equal to the magnitude of the contraction potential difference change.

14. The liquid ejection apparatus according to claim 11, wherein the stages are equal voltage increments in magnitude.

15. The liquid ejection apparatus according to claim 11, wherein the number of stages in the expansion potential difference change is two, and the number of stages in the contraction potential difference change is two.

16. The liquid ejection apparatus according to claim 11, wherein the number of stages in the expansion potential difference change is three, and the number of stages in the contraction potential difference change is three.

17. The liquid ejection apparatus according to claim 11, wherein when the period of the acoustic resonance frequency is λn and the number of stages in each of the expansion and contraction potential difference changes is h, an i-th stage is any one of the h stages, and a j-th stage is another one of the h stages after the i-th stage, then the time interval Tij between the i-th potential difference change start time and the j-th potential difference change start time satisfies the relationship:

$(k/2-1/6)\lambda n \leq Tij \leq (k/2+1/6)\lambda n$, when k is an odd number of 1 or more.

18. The liquid ejection apparatus according to claim 17, wherein the time interval Tij satisfies the relationship:

$$(k/2-1/6)\lambda n \leq Tij \leq k\lambda n/2.$$

19. The liquid ejection apparatus according to claim 11, wherein the acoustic resonance frequency is an odd multiple of approximately three times or more of the main acoustic resonance frequency.

20. The liquid ejection apparatus according to claim 11, wherein the drive circuit includes a switching circuit connecting electrodes of the actuator to a voltage source and generates the drive signal by switching of the switching circuit.

* * * * *